March 31, 1925.

B. E. WALTON

CHILD'S VEHICLE

Filed Jan. 17, 1923

1,531,585

Inventor
Ben E. Walton
By Lancaster Allison
Attorneys

Patented Mar. 31, 1925.

1,531,585

UNITED STATES PATENT OFFICE.

BEN E. WALTON, OF SPRINGFIELD, MASSACHUSETTS.

CHILD'S VEHICLE.

Application filed January 17, 1923. Serial No. 613,221.

*To all whom it may concern:*

Be it known that I, BEN E. WALTON, a citizen of the United States, residing at Springfield, in the county of Hampden and State of Massachusetts, have invented certain new and useful Improvements in Children's Vehicles, of which the following is a specification.

This invention relates to improvements in vehicles of the coaster type.

The primary object of this invention is the provision of a coaster or child's vehicle embodying a very durable, yet simple construction, which may be easily operated.

A further object of this invention is the provision of a child's vehicle of the coaster type, preferably of the balance suspension construction, and embodying a novel frame which will permit of the location of the handle where the same will most effectively enable an operator to balance himself or herself upon the vehicle and guide the same.

A further object of this invention is the provision of a two wheel coaster vehicle which embodies a durable and economical association of parts, assembled in such manner as to permit a child to operate the same with comparative safety.

Other objects and advantages of this invention will be apparent during the course of the following detailed description.

In the accompanying drawing, forming a part of this specification, and wherein similar reference characters designate corresponding parts throughout the several views, Figure 1 is a perspective view of the improved vehicle or coaster.

Figure 1:
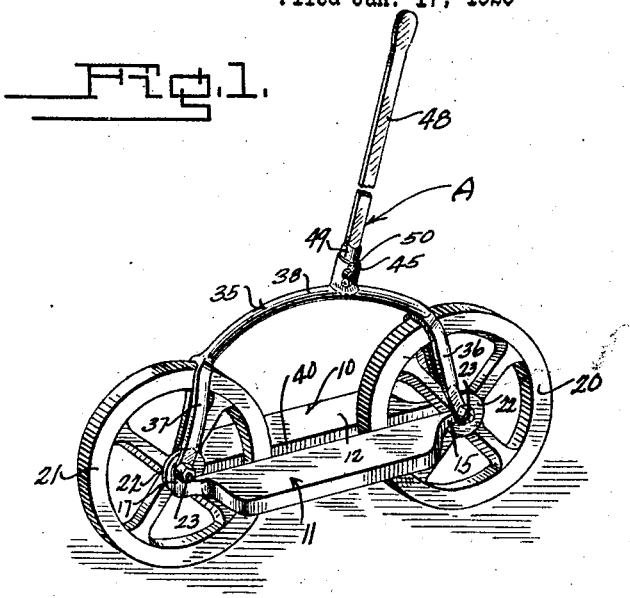

In the drawing, wherein for the purpose of illustration is shown but the preferred embodiment of this invention, numerals 10 and 11 designate foot rests or step plates, preferably of metal, and cast to provide an elongated flat foot receiving plate surface 12. At its forward end, each of the step members are provided with an outstanding laterally reduced portion 15, having a transverse opening 16 therethrough.

At the rear end of each of said foot members, a laterally reduced, and upstanding lug or portion 17 is provided, having a transverse opening 18 therein which is disposed upwardly of the plane of the foot engaging surface 12.

Figure 2:
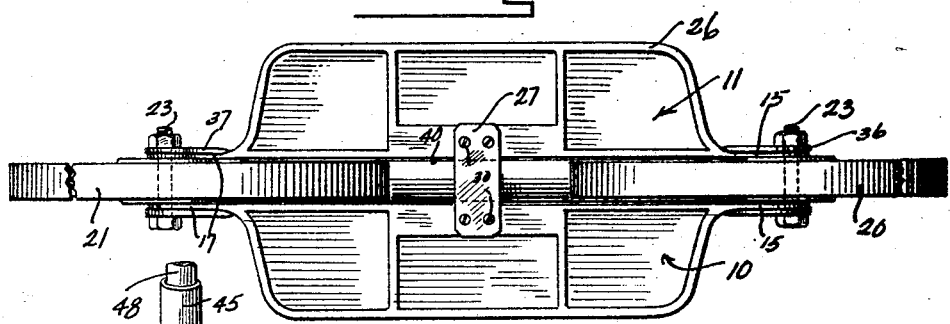
Figure 2 is a bottom plan view of the improved coaster.
Figure 3:
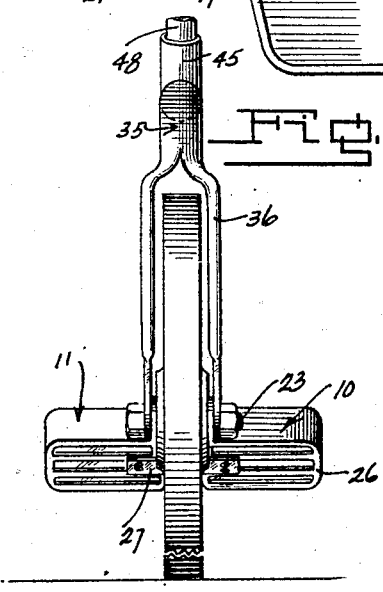
Figure 3 is a front elevation of the improved vehicle.
Figure 4:
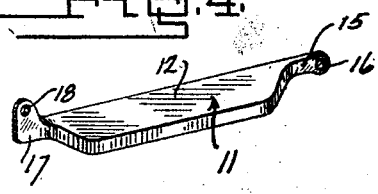
Figure 4 is a perspective view of an individual step or foot rest member used as a principal part of this invention.

The plates or foot members 10 and 11 are preferably rights and lefts, and a pair of the same are used for each coaster A. Front and rear supporting wheels 20 and 21 respectively are provided, preferably of the same size, including hub structures 22 having openings therein for receiving axles 23. The front wheel 20 is rotatably connected to the front portions 15 of the step plates 10 and 11, as by having the axle 23 connected through the aligned openings 16 of said step plates 10 and 11. The rear wheel 21 is similarly connected through the aligning openings 18 of the step plates 10 and 11, by means of the rear axle 23. In this relation of parts, it will be observed that the foot engaging surfaces 12 of the step members 10 and 11 lie in the same plane, while the plates are transversely spaced throughout the length thereof, and in which space, the supporting wheels 20 and 21 are rotatably mounted as above mentioned. Incident to the fact that the wheels are preferably of the same size, and the opening 18 at the rear ends of the said plates 10 and 11 offset with respect to the planes of said step plates, it is obvious that when attached to the supporting wheels 20 and 21, the plates 10 and 11 will incline upwardly and forwardly with respect to the horizontal or ground surface upon which the coaster is resting. The step plates or foot rest members 10 and 11 when of metal construction, are preferably hollowed and provided with the peripheral reinforcing flanges 26. A transverse connecting plate or arm 27 is provided, intermediate the front and rear wheels, and attached as by screw elements 30 to the spaced plates 10 and 11 beneath the same, substantially as is illustrated in Figure 2 of the drawing.

A frame yoke 35 is preferably provided, of novel construction as used upon children's coasters, which may be of metal, including the front bifurcated or forked portion 36, rear forked or bifurcated portion 37, and the intermediate upwardly arched portion 38 connecting the forked or bifurcated portions 36 and 37. The forked portions 36 and 37 are preferably bridged over the supporting wheels 20 and 21 respectively, and securely connected at their lower ends to the axles 23. Thus, the arch portion 38 extends upwardly of the supporting wheels 20 and 21, directly over the space 40 between the flush step plates 10 and 11.

Intermediate the supporting wheels 20 and 21, a socket 45 is preferably provided, integral with are arched portion 38 of the yoke member 35, and providing an opening, the axis of which is preferably inclined forwardly of the coaster A. A handle 48, of any approved type may be provided, having an inserting end 49 adapted for reception within the opening of the frame socket 45. A clamp nut 50 of the wing type may be provided, carried by the socket 45, for clamping the inserting end 49 of the handle structure 48, so that the handle extends upwardly and inclines forwardly of the coaster.

In use, the child or person using the vehicle, after having obtained momentum, will stand upon the steps or plates 10 and 11. Incident to the positioning of the handle 48 intermediate the supporting wheels 20 and 21, and preferably closer to the front wheel 20 than the rear wheel 21, a relatively easy guiding of the vehicle may be attained. The positioning of the handle in this location, enables the operator to place his or her weight mainly upon the rear supporting wheel 21, when it is desired to shift the directional movement, and by so placing the weight and lifting upon the handle 48, the operator is enabled to laterally shift the front supporting wheel 20 as to change the directional movement. It is not necessary to provide any oscillating steering mechanism which requires attention, is expensive, and not practical for the type of coaster generally used by children as affording the most amusement.

Various changes in the shape, size, and arrangement of parts, such as the integral formation of the step plates 10 and 11, may be made to the form of the invention herein shown and described, without departing from the spirit of this invention or the scope of the claims.

I claim:

1. A coaster comprising foot rests, supporting wheels attached at the front and rear of the foot rests, a yoke connected at its ends to the front and rear of the foot rests and extending upwardly of said supporting wheels, and a handle extending upwardly of the yoke.

2. A coaster comprising foot rests, supporting wheels attached at the front and rear ends of the foot rests, a yoke connected at its ends to the front and rear of the foot rests, and a handle extending upwardly of the yoke intermediate the front and rear wheels.

3. A coaster comprising foot rests, supporting wheels attached at the front and rear ends of the foot rests, a yoke connected at its ends to the front and rear of the foot rests, and a handle extending upwardly of the yoke intermediate the front and rear wheels and inclining forwardly of the coaster.

4. A coaster comprising a pair of step members having bearing arms extending from their forward and rear end portions, the arms at one end having offset portions, wheels rotatably mounted between the bearing arms, the offset portions of the bearing arms at one end causing the step members to extend at an upward incline from one end towards the other, and handle means extending upwardly above said step members.

5. A coaster comprising a step member, front and rear wheels rotatably carried by said step member, and a yoke member spanning intermediate said front and rear wheels above said step member and connected to said step member at the points of connection of said front and rear wheels thereto.

6. A child's vehicle comprising a foot rest frame, front and rear wheels rotatably connected to the foot rest frame, and a yoke member including bifurcated ends bridging said front and rear wheels and connected to said foot rest member at the points of connection of said wheels therewith, said yoke member including an intermediate portion extending upwardly of said supporting wheels.

7. A coaster comprising a foot rest member, front and rear wheels rotatably carried by said foot rest member, a yoke including bifurcated ends bridging said supporting wheels and connected at the axes of said wheels to said foot rest member, and a handle extending upwardly of said yoke and inclining forwardly of said coaster.

8. A child's vehicle comprising a pair of foot plates having front and rear openings therein, axles transversely disposed thru the openings at the front and rear of said step plates to dispose said step plates in substantially the same plane, front and rear wheels rotatably carried by said axles, and operating in substantially the same plane intermediate said foot plates, a yoke including bifurcated end portions and an arcuate intermediate portion, said bifurcated end portions bridging said front and rear wheels and connected to the axles thereof, and handle means connected to the intermediate portion of said yoke intermediate said front and rear wheels and extending upwardly of the vehicle and inclining forwardly thereof.

BEN E. WALTON